Oct. 12, 1971    J. GASIOR    3,611,750
FLEXIBLE TORSIONALLY-RESILIENT COUPLING
Filed Oct. 23, 1969    3 Sheets-Sheet 1
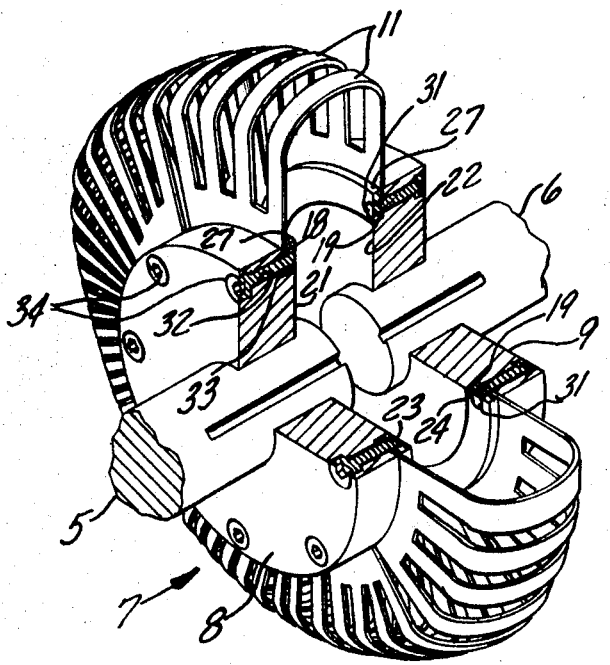
*Fig. 1*
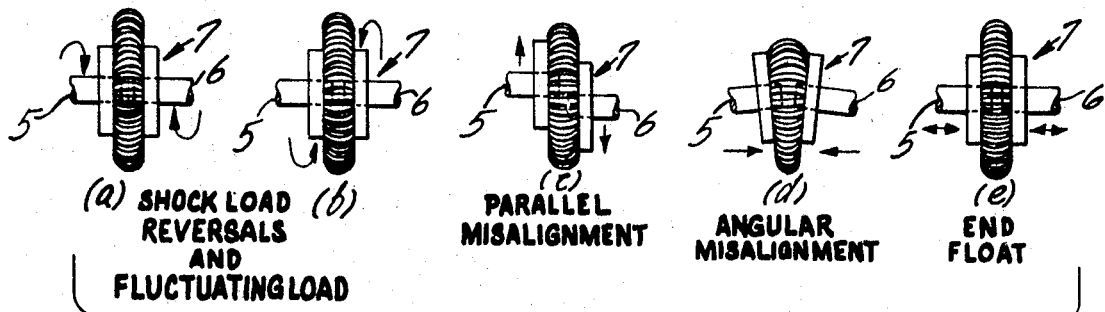
(a) (b) SHOCK LOAD REVERSALS AND FLUCTUATING LOAD    (c) PARALLEL MISALIGNMENT    (d) ANGULAR MISALIGNMENT    (e) END FLOAT
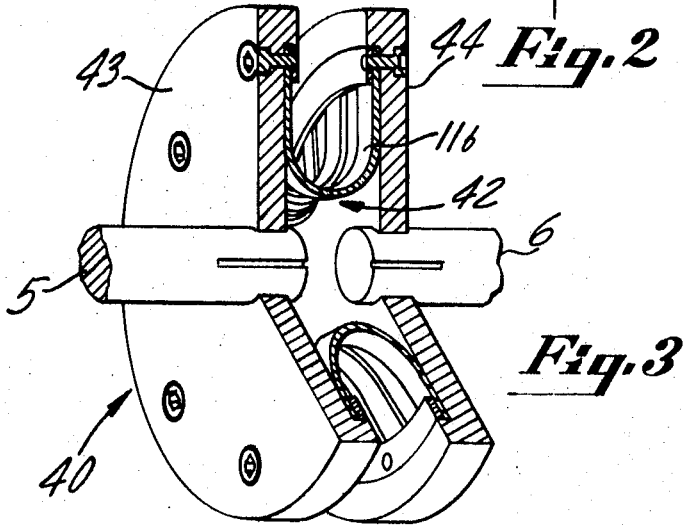
*Fig. 2*
*Fig. 3*
INVENTOR.
JOSEPH GASIOR
BY
*J. M. Porta*
ATTORNEY

INVENTOR.
JOSEPH GASIOR
BY
ATTORNEY

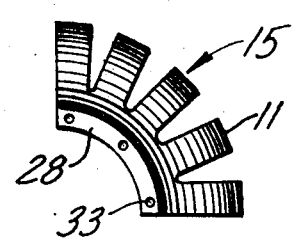
Fig. 11
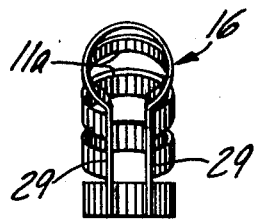
Fig. 13
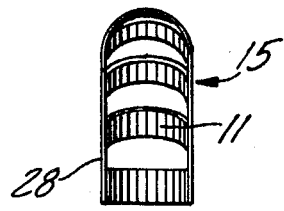
Fig. 12
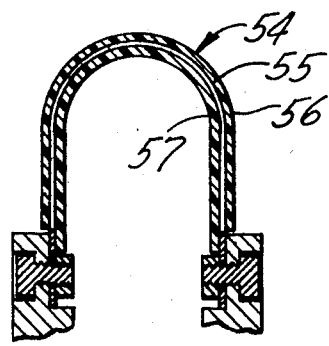
Fig. 14
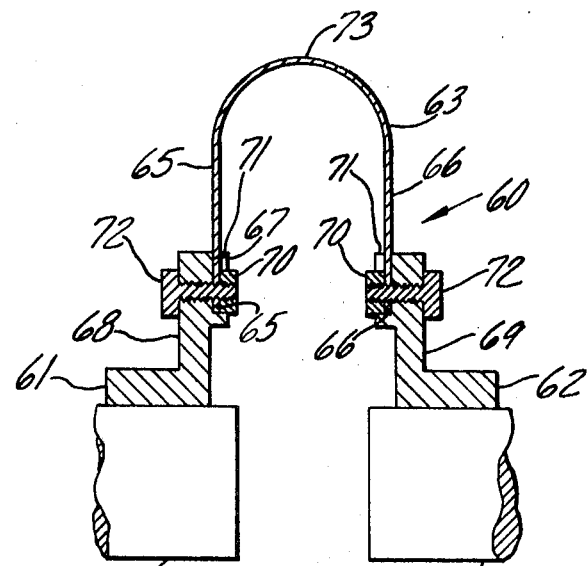
Fig. 15
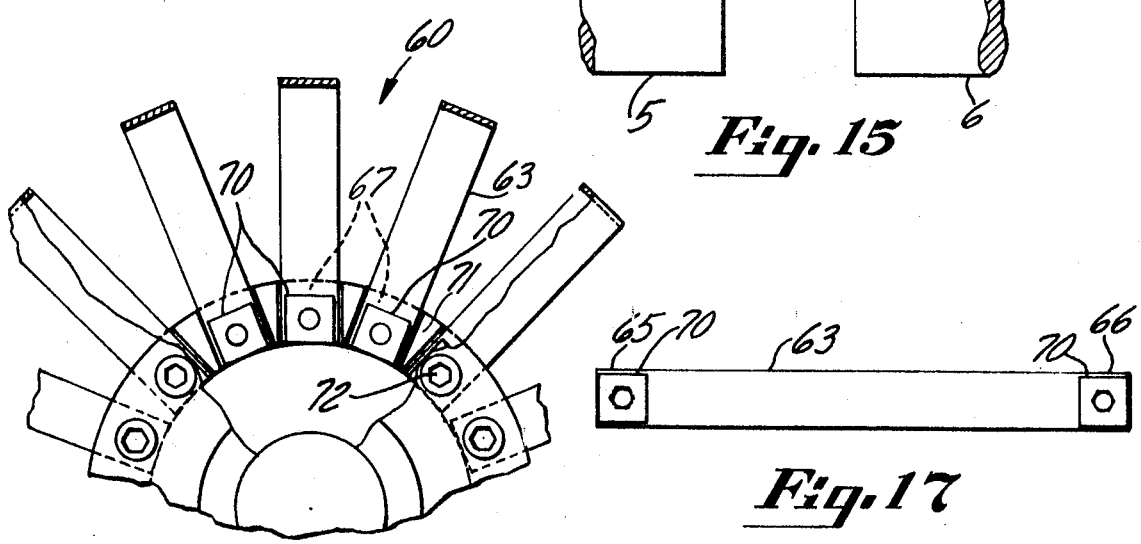
Fig. 16
Fig. 17
INVENTOR.
JOSEPH GASIOR
BY
ATTORNEY

United States Patent Office 3,611,750
Patented Oct. 12, 1971

3,611,750
FLEXIBLE TORSIONALLY-RESILIENT COUPLING
Joseph Gasior, Bloomfield, N.J., assignor to
Midland-Ross Corporation
Filed Oct. 23, 1969, Ser. No. 868,798
Int. Cl. F16d 3/66
U.S. Cl. 64—15
3 Claims

ABSTRACT OF THE DISCLOSURE

A coupling comprising angularly-spaced U-shaped strap-like spring elements in rigid connection with supporting hub or flange members of a coupling and capable of accommodating parallel and angular misalignment, adjusting to axial relative movement of opposed shafts, and cushioning sudden changes of torque.

DESCRIPTION

While the prior art contains numerous designs in the field of torque couplings and universal joints, some of which are based upon a plurality of angularly-spaced spring elements extending between the driving and driven hub members of a torque-transmitting coupling, none are known to secure strap-like members of rectangular cross section to coupling hub portions in a manner as to subject relatively straight longitudinal sections of the members to twisting forces such as are generated in torque transmission sufficient to cause deformation within the coupling.

An important object of the invention is to utilize light gauge metal in a very efficient manner in the construction of a low cost coupling capable of resilient absorption of torsion forces and adjustment to parallel and angular axial misalignments as well as resilient accommodation to axial movements of driving and driven rotating components.

A further object is to produce a coupling in conformity with the foregoing object wherein the force-absorbing mechanism is divided into easily replacement components that may be inexpensively replaced.

It is also an object to produce the essential force-absorbing mechanism of the coupling from light gauge metal, such as sheet steel, which may be inexpensively shaped in sectors adapted for connection with driving and driven hub members of the coupling. It is, in fact, contemplated within this object to form such sectors from flat material without hot-forming, i.e., without appreciable yielding of the material in a direction transversely to its thickness.

To accomplish the above and other objects, a coupling construction has been discovered in which strap-like U-shaped elements disposed in spoke-like arrangement around the axis of rotation of the coupling between driving and driven members function more effectively than known from the prior art devices if the ends of the shanks of the elements are anchored in the opposing flange or hub members of the coupling so as to avoid any possibility of yielding with respect to the associated flange or hub member within the connection itself. This type of construction causes the intermediate portions of the shanks of the elements to be subjected to torsion whereas, if the connection between the element and the flange or hub member is not rigid, the element is subjected to twisting forces primarily within the crown section which connects the two shanks of the element and thus is utilized in a less efficient manner.

In the drawing with respect to which the invention is described:

FIG. 1 is a perspective view of a coupling in accordance with one embodiment of the invention with a quarter section cut away;

FIG. 2 sets forth schematically side elevation views of the coupling of FIG. 1 in various conditions of loading likely to cause displacement between driving and driven parts;

FIG. 3 is a perspective view of a coupling in accordance with another embodiment with approximately a third section removed;

FIG. 11 is a side elevation of a sector having its strap-like elements extending outwardly from its flange portions of a type useful in the coupling of FIG. 1;

FIG. 12 is an end view of the sector of FIG. 11;

FIG. 13 is an end view of a modified sector having a side elevation similar to that shown in FIG. 11;

FIG. 14 is a transverse section of a sector such as shown in FIGS. 11 and 12 with a resilient material added to the exterior and interior surfaces of the basic metal component of a strap-like element of a sector;

FIG. 15 is a fragmentary diametral cross section of a modified coupling utilizing independent strap-like elements and hub members shaped to interlock with the elements;

FIG. 16 is a fragmentray side view of the coupling of FIG. 15; and

FIG. 17 is a plan view of an element of the coupling of FIG. 15 and FIG. 16 in planate condition.

Figure 4:
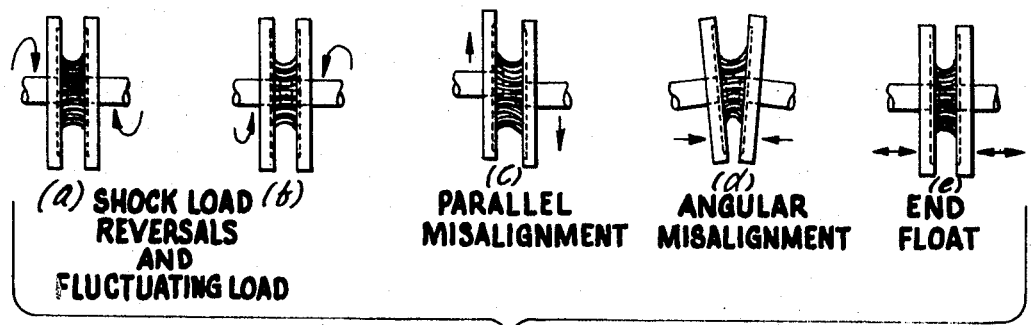
FIG. 4 shows schematically several views of the coupling of FIG. 3 under various conditions of loading contributing to displacement between driven and driving components.

FIG. 1 illustrates one form of a coupling in accordance with the invention for transmitting rotative power between shafts 5 and 6. As shown, the coupling 7 comprises a pair of hub or flange members 8, 9 connected by thin gauge U-shaped strap-like elements 11 which, in a preferred embodiment, constitute portions of sectors typified by a quarter sector or quadrant 15 as shown in FIGS. 11 and 12. The elements 11 are supported in this embodiment in arched radially outward disposition relative to the hub members.

FIG. 13 illustrates a quadrant 16 similar to quadrant 15 but modified to provide strap-like elements 11a of somewhat more C-shaped or looped configuration than the U-shaped elements 11 of quadrant 15. The quadrants 15, 16 are interchangeable within the general structure of the coupling shown in FIG. 1. Either type of quadrant is incorporated into the coupling structure as the essential resilient component thereof by securing the quadrants to the flange or hub members 8, 9 in a manner that fixes the ends of the shanks of the elements 11 in respect to the hub members. In the coupling of FIG. 1, the hub members are provided with surfaces 18, 19 which are laterally inset with respect to the inner disc surfaces 21, 22, respectively, to define circular shoulders 23, 24, respectively. The shoulders 23, 24 are of a circumference less than that of the inner periphery of a full circle of sectors or quadrants 15, 16 so that the quadrants may be positioned along the shoulders of hub members 8, 9, as shown, for positive securement of the quadrants to the hub members, the coupling comprises rings 26, 27 of slightly greater diameter than the shoulders 23, 24 enabling the rings to seat against axially facing surfaces of marginal flange portions 28 in the case of quadrant 15, or flange portions 29 in the case of quadrant 16. The rings have threaded holes 31 in registry with somewhat larger holes 32 in the hub members and holes 33 in either type of sector or quadrant through which fasteners, such as cap screws 34 extend. It will be noted that the holes for the cap screws in the hub members are counterbored to permit recessed disposition of the cap screw heads inwardly of the outer lateral faces of the hub members. With the flange portions and perhaps the joined end portions of the elements 11 sandwiched between rings 26, 27 and cooperating hub surfaces 18, 19, the cap screws 34 may be turned up tightly to firmly clamp such quadrant or sector portion firmly between the hub members and the rings, and thus prevent any possible movement of the end portions of the elements 11 in the general area where they join with the flange portions of the quadrants relative, e.g., to the adjacent rings 26, 27 and flange portions of the hub members 8, 9.

The sectors of FIGS. 11–13 are preferably stampings from sheet spring metal shaped by either cold or hot drawing to any practical angular size. While quadrants are shown, sectors 15 and 16 may have an angular length of less than 90 degrees or up to 180 degrees. Angular lengths greater than 180 degrees give rise to forming and assembly difficulties.

FIG. 2 schematically illustrates the various types of loading to which the coupling 7 is adapted to yield. Items *a* and *b* of FIG. 2 illustrate that the coupling is intended to sustain and cushion shock loads arising from reversals and sudden fluctuations in the torque power transmitted between shafts 5 and 6. FIG. 2, item *c* illustrates that the coupling 5 will deform under operating conditions wherein the shafts 5, 6 are rotating on non-coaxial parallel axes. FIG. 2, item *d* illustrates that the coupling 7 deforms into conformity with angular misalignment of an input shaft and an output shaft. Item *e* of FIG. 2 indicates that the coupling 7 will deform within the elements 11 in response to axial movements of the input and output shafts toward and away from each other.

FIG. 3 is a perspective view of a modified coupling 40 with a section removed. Coupling 40, which is distinguishable from the coupling 7 essentially by the radial orientation of strap-like elements 11*b* in a direction radially inwardly from flange means 41 in which the elements terminate. Elements 11*b* occur, in a preferred embodiment, in a quadrant or sector, such as the quadrant or sector 42 illustrated in FIGS. 9 and 10. All torque loads passing between shafts 5, 6 are transmitted through the plurality of element 11*b* provided by the sectors of the coupling secured to, and between, coupling hubs 43, 44. The elements 11*b* are supported in principle in the manner described heretofore in regard to elements 11. That is to say, the distal end portions of the shanks of the elements 11*b* are rigidly fixed to flange means 41 of the same sector, the sectors in turn being secured to the hubs 43, 44.

Figure 5:
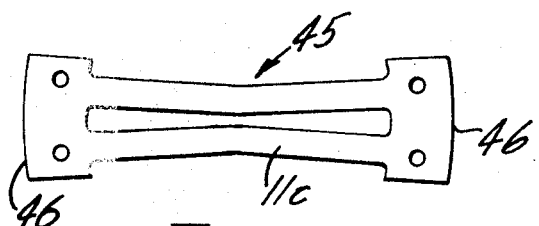
FIG. 5 is a plan view of a sector in flattened planate condition which may be bent in U-shaped pattern to provide energy-absorbing elements of a coupling.
Figure 6:
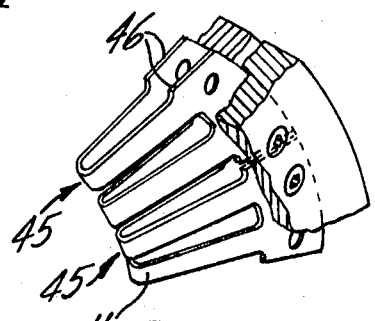
FIG. 6 is a perspective view of elements, such as shown in FIG. 5, in the actual configuration as used in a coupling.
Figure 9:
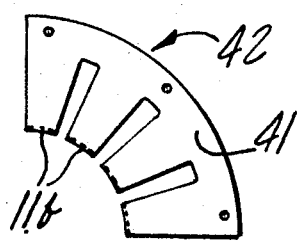
FIGS. 9 and 10 are a side elevation and an end elevation, respectively, of a quadrant or quarter sector with the strap-like elements shaped radially inwardly from flange portions in the manner of the sector of FIG. 8.
Figure 10:
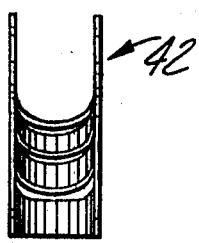

FIGS. 5 and 6 illustrate a sector 45 shown in FIG. 5 as it would appear in planate condition and in FIG. 6 as it appears in operative configuration. The sector 45 comprises U-shaped elements 11*c* which extend radially inwardly from respective flange portions 46 in the manner of the elements of sector 42 (FIGS. 9 and 10). Sector 45 is readily substitutable for any other type of sector used in coupling 40. Sector 45 is formed from flat sheet stock without special shaping. It is not advisable to form sectors of more than two elements 11*c* since all the elements of a sector formed of planate stock tend to fold along a tangent to a circle roughly conforming to the radially inward crown surfaces of such elements, whereas the sectors formed by hot-shaping or drawing may be shaped with their crown sections conforming precisely to a circle. FIG. 6 illustrates two sectors 46 along with a fragment 47 of one of two hub members to which a complete circle of sectors 46 are attached.

Figure 7:
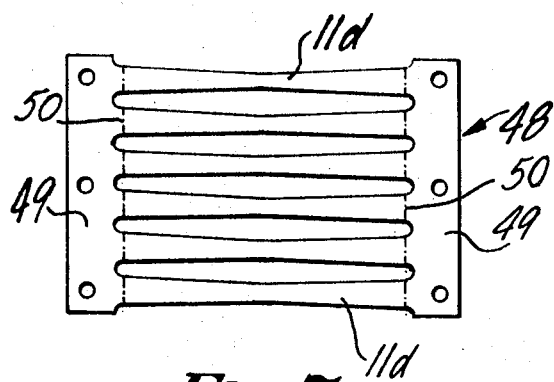
FIG. 7 is a plan view of another sector shown in its planate flattened condition.
Figure 8:
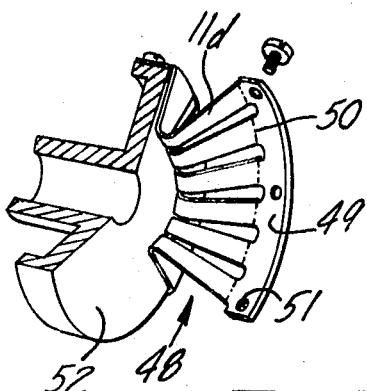
FIG. 8 is a perspective view of the sector of FIG. 7 as formed for use within a coupling with a section of a hub member attached thereto.

FIGS. 7 and 8 illustrate another type of sector which may be formed of flat sheet metal stock. In FIG. 7 sector 48 is shown as a stamping in planate condition and in FIG. 7 in folded operable condition. This sector comprises flat strap-like elements 11*d* which, in the planate condition, have parallel longitudinal axes and merge at either ends with marginal lands 49 which, in the folded condition of the sector, become arcuate, band-like flanges 49. While sector 48 forms a quadrant in its folded condition of FIG. 8, the planate piece of FIG. 7 may, e.g., be doubled in length to provide a sector of 180 degrees in angular length. Hence, a coupling would comprise two of such sectors 180 degrees in length to form a complete circle of elements 11*d*. Such a coupling is considered a preferred embodiment of the invention. As shown in FIG. 8, the flanges 49 have holes 51 through which cap screws may be extended radially into a hub member such as the hub 52 shown. The crown or center sections of the elements 11*d* are spaced sufficiently to allow them to concentrate without binding along a circle about the hub axis.

As further shown in FIGS. 7 and 8, the sector 48 has fold lines 50 along which the elements 11*d* form an angle with lands or flanges 49 when the sector is positioned within the coupling according to FIG. 8. As illustrated by both FIGS. 7 and 8, the fold lines 50 extend transversely of the elements 11*d* in a manner disposing small proximal portions thereof on the same sides of the fold lines 50 as respective contiguous flanges or lands 49.

FIG. 14 is a cross-sectional view illustrating an element 54 of a sector which may typify an element of any of the embodiments described herein wherein surfaces of a metal strap-like component of the element facing along a radial plane containing the axis of rotation of a coupling incorporating the element may be covered by a resinous rubber-like flexible material such as any one of the various natural or synthetic elastomers. FIG. 14 shows the component 55 coated along its exterior surface with a layer 56 and along its interior surface with a layer 57. While such layers are disclosed primarily as a medium for dampening vibrations, the resinous compositions used may be reinforced with high strength fibers or fabrics to enhance the torsion capabilities of the couplings. Either or both sides of the elements may be covered.

As a final embodiment described herein, FIGS. 15, 16 and 17 illustrate that a coupling 60 may comprise a pair of hubs 61, 62 and a plurality of elements 63 in the form of straps apertured at each end formed to a U-shape configuration with distal ends of the legs 65, 66 fitting within rectangular recesses 67 in flange portions 68, 69 of hubs 61, 62, respectively. The recesses 67 are separated by angular shape raised lands 71. As shown, the element-engaging surfaces of the recesses 67 of each hub extend within a single radial plane, although it is quite possible to dispose such surfaces between two circumferences along a frusto-conical surface of revolution. The side walls of the lands 71 are shaped to form the recesses 67 to a width accurately conforming to the edges of the element 63 received by the recesses. The elements 63 may comprise, as shown, flat nuts 70 secured to the ends of the strap component of the element. The nuts 70 substantially cover the ends of the elements. Cap screws 72 in threaded relation with the nuts firmly secure the ends of the elements within the recesses 67 so that there be no relative movement between the distal end portions of element 63 and the flange portions 68, 69 and that deflection of the elements 63 as a result of torque transmitted from one hub to the other will be sustained essentially in the intermediate portions of the two shanks or legs of each element rather than in the crown section 73 thereof.

What is claimed is:

1. A torque-transmitting coupling comprising:

a pair of hub members in axially-spaced normally-concentric relation with an axis of rotation;

a plurality of sectors, each comprising a plurality of strap-like elements located in angularly-spaced radial planes about said axis extending between and terminating in two arcuate flanges;

said sectors comprising an originally flat sheet material in which said elements and flanges are integrally joined, each sector being deformable without stretching or yielding of the sheet material between a planate condition and a U-shape condition wherein said elements are disposed along respective planes of said radial planes;

each of said sectors being of said U-shape condition within the coupling with one flange portion thereof being fixedly joined to one hub and the other flange portion fixedly joined to the other hub;

fastening means for securing said flange portions of each sector to respective hubs along a circular surface thereof concentric to said axis to thus attach all of said sectors to the hubs in a circular pattern concentric to said axis.

2. The coupling of claim 1 wherein:

said hubs have cylindrical outer surfaces;

said sectors in the planate condition are of generally rectangular shape with said elements extending in generally parallel relationship between two generally parallel lands and said lands form said flanges in the formed operable condition of the sectors and extend in arcuate band-like configuration complementary to said cylindrical surfaces when said elements are disposed in said U-shape condition in respective radial planes relative to said axis.

3. The coupling of claim 2 wherein:

the sectors have fold lines along which the elements form an angle with said lands or flanges within the coupling; and said fold lines extend transversely of said elements to dispose small proximal portions thereof on the same sides of the fold lines as respective contiguous flanges.

References Cited
UNITED STATES PATENTS

| | | | |
|---|---|---|---|
| 1,214,307 | 1/1917 | Hosford | 64—15 |
| 1,369,349 | 2/1921 | Murphy | 64—15 |
| 2,840,998 | 7/1958 | Reick | 64—11 |

MARK M. NEWMAN, Primary Examiner

R. HEALD, Assistant Examiner